F. S. SHIRLEY.
SHADE-HOLDER AND GAS-BURNER.
No. 189,799. Patented April 17, 1877.
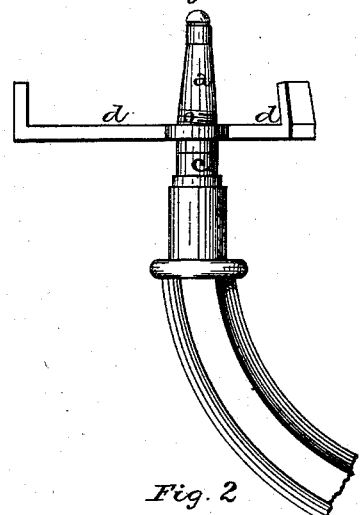
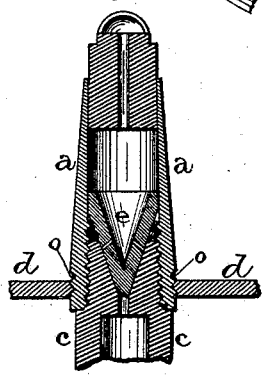
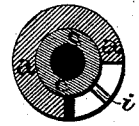
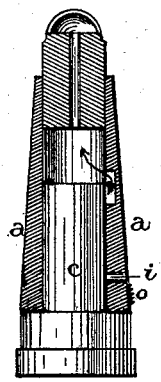
WITNESSES: INVENTOR:

UNITED STATES PATENT OFFICE.

FREDERICK S. SHIRLEY, OF NEW BEDFORD, MASSACHUSETTS.

IMPROVEMENT IN SHADE-HOLDERS AND GAS-BURNERS.

Specification forming part of Letters Patent No. 189,799, dated April 17, 1877; application filed March 21, 1877.

*To all whom it may concern:*

Be it known that I, FREDERICK STACEY SHIRLEY, of New Bedford, in the county of Bristol and State of Massachusetts, have invented certain new and useful Improvements in Shade-Holders and Gas-Burners; and I do hereby declare the following to be a full, clear, and exact description of the invention, such as will enable others skilled in the art to which it pertains to make and use it, reference being had to the accompanying drawings, which form part of this specification.

My invention relates to an improvement in shade-holders and gas-burners; and it consists in controlling the flow of gas by means of a burner that is connected to the holder, so that by turning the holder around the burner will revolve with it, and thus check or increase the flow of gas, as will be more fully described hereinafter.

Figure 1 is a side elevation of my invention. Fig. 2 is an enlarged vertical section of the same. Figs. 3, 4, and 5 are detail views of a modified form of the burner shown in Figs. 1 and 2.

Each burner is made in two pieces, having the part $a$, to which the tip is attached, screwed down on the lower one, $c$. In the top of this part $c$ is made a conical recess, and in the bottom of the upper part $a$ is made a cone, $e$, which fits down in the recess, so as to cut the gas off altogether, or only partially so. Screwed down upon the outside of this upper part $a$ is the shade-holder $d$, by means of which the part $a$ is operated.

By turning the shade the part $a$ is turned also, and thus the gas may be entirely or only partially cut off.

The upper part $a$ of the burner has a screw-thread, $o$, cut in its surface, so as to form a ready means of fastening the shade-holder $d$ to it. When it is no longer desired to use a shade with the burner, both it and its holder can at once be removed, so that only the plain burner will remain.

Instead of screwing the two parts of the burner together, as above described, the lower part may have a stud, $i$, projecting out from its side, while the upper part $a$ has a slot, $o$, which limits its rotary movement. Through the top of the lower part is made a small hole, through which the gas escapes upward to the tip, and corresponding to this hole is an internal recess in the upper part.

When the upper part is so turned that the recess comes opposite to the hole, the gas escapes freely upward; but when turned so that the hole and recess are separated, the flow of gas is stopped.

Having thus described my invention, I claim—

In combination with the shade-holder $d$, a gas-burner that is made in two parts, $a$ $c$, the holder being fastened to one of the said parts, so as to cause it to turn around, and thereby control the flow of gas, substantially as shown and described.

In testimony that I claim the foregoing I have hereunto set my hand this 28th day of February, 1877.

FREDK. STACEY SHIRLEY.

Witnesses:
   WENDELL H. COBB,
   WALTER CLIFFORD.